(12) United States Patent
Iljima et al.

(10) Patent No.: US 8,221,551 B2
(45) Date of Patent: Jul. 17, 2012

(54) APPARATUS FOR PRODUCING A REFLECTOR

(75) Inventors: Masayuki Iljima, Kanagawa (JP);
Yosuke Kobayashi, Kanagawa (JP);
Kouji Hirayama, Kanagawa (JP);
Yusuke Hashimoto, Kanagawa (JP);
Ryuji Hamada, Kanagawa (JP); Ken Momono, Kanagawa (JP); Atsushi Nakatsuka, Kanagawa (JP)

(73) Assignee: Ulvac, Inc., Kanagawa (JP)

( * ) Notice: Subject to any disclaimer, the term of this patent is extended or adjusted under 35 U.S.C. 154(b) by 715 days.

(21) Appl. No.: 12/307,312

(22) PCT Filed: Jun. 7, 2007

(86) PCT No.: PCT/JP2007/061528
§ 371 (c)(1),
(2), (4) Date: Jan. 2, 2009

(87) PCT Pub. No.: WO2008/004397
PCT Pub. Date: Jan. 10, 2008

(65) Prior Publication Data
US 2009/0208664 A1    Aug. 20, 2009

(30) Foreign Application Priority Data
Jul. 4, 2006 (JP) .................. 2006-184018

(51) Int. Cl.
*B01J 19/08* (2006.01)
*C23C 16/54* (2006.01)

(52) U.S. Cl. ............. 118/730; 118/723 R; 118/733; 427/162

(58) Field of Classification Search .......... 427/162, 427/250, 251, 404, 294, 536, 255.5, 255.6, 427/255.7; 118/730, 733, 719, 723 R, 726; 264/1.1, 83
See application file for complete search history.

(56) References Cited

U.S. PATENT DOCUMENTS

| | | | | |
|---|---|---|---|---|
| 4,565,157 A | * | 1/1986 | Brors et al. ............ | 118/719 |
| 6,398,999 B1 | * | 6/2002 | Josephy et al. .......... | 264/81 |
| 2003/0132101 A1 | * | 7/2003 | Ikadai et al. ............ | 204/192.12 |

FOREIGN PATENT DOCUMENTS

| JP | 2000275422 A | 10/2000 |
|---|---|---|
| JP | 2003207611 A | 7/2003 |
| JP | 2005310386 A | 11/2005 |

* cited by examiner

*Primary Examiner* — Matheiu D. Vargot
(74) *Attorney, Agent, or Firm* — Harness Dickey & Pierce, PLC

(57) ABSTRACT

Provided is a deposition apparatus that has a metal evaporation source for depositing a reflective layer, a pigment evaporation source for depositing a coloring layer, and a plasma polymerization source (electrode) for depositing a protective layer disposed inside a single vacuum processing room. By carrying out a step of depositing the reflective layer, a step of depositing the coloring layer, and a step of depositing the protective layer in the common vacuum processing room, processes can be simplified and an operation time can be reduced.

3 Claims, 4 Drawing Sheets

APPARATUS FOR PRODUCING A REFLECTOR

FIELD

The present invention relates to an apparatus and method for producing a reflector used in, for example, a lighting fixture for an automobile.

BACKGROUND

Currently, a coloring reflection lamp (reflector) used in a lighting fixture of a headlight of an automobile and the like includes a reflecting mirror formed by laminating, on a surface of a resin-molded substrate, a reflective layer and a coloring layer (protective layer) for coloring the reflective layer. A metal deposition layer formed of aluminum and the like is mainly used for the reflective layer. A pigment-containing wet coating is, from the past, used for the coloring layer.

In a method of producing a reflector in the related art, depositions of a reflective layer and a coloring layer are carried out separately in dedicated processing chambers, and a reflector production process is performed after deposition processing is carried out on a substrate in each of the processing chambers and processing of conveying the substrate between the processing chambers is finished.

SUMMARY

Problem to be solved by the Invention

In the method of producing a reflector of the related art, however, because the coloring layer is formed from the pigment-containing wet coating, a preliminary processing of a base layer of the coloring layer or drying processing after wet coating becomes necessary, thus leading to a complication of equipment and an increase in costs, and also disabling a reduction in an operation time.

The present invention has been made in view of the problems above and therefore has an object to provide an apparatus and method for producing a reflector that are capable of simplifying processes and reducing an operation time.

Means for Solving the Problem

To solve the problems above, an apparatus for producing a reflector according to the present invention is characterized in that a metal layer forming means for depositing a reflective layer, a pigment layer forming means for depositing a coloring layer, and a protective layer forming means for depositing a protective layer are disposed inside a single vacuum processing room.

The present invention is characterized in that the metal layer forming means is a metal evaporation source, the pigment layer forming means is a pigment evaporation source, and the protective layer forming means is a plasma polymerization source.

Further, a method of producing a reflector is characterized in that a step of depositing a reflective layer, a step of depositing a coloring layer, and a step of depositing a protective layer are carried out inside a common vacuum processing room.

In the present invention, the coloring layer is deposited by a vapor-deposition method. Thus, due to provision of the metal evaporation source, the pigment evaporation source, and the plasma polymerization source in the vacuum processing room, the depositions of the reflective layer, the coloring layer, and the protective layer are carried out consistently within the same vacuum processing room. Accordingly, processes can be simplified and an operation time can be reduced.

Moreover, in the apparatus for producing a reflector according to the present invention, the vacuum processing room has inside a drum-shaped substrate holder that simultaneously accommodates the metal layer forming means, the pigment layer forming means, and the protective layer forming means, the substrate holder being rotatable inside the vacuum processing room, and the substrate is provided plurally and supported on an inner circumferential surface of the substrate holder. Furthermore, in each of the step of depositing the reflective layer, the step of depositing the coloring layer, and the step of depositing the protective layer with respect to a surface of a substrate, the substrate is revolved inside the vacuum processing room by a rotation of the substrate holder so that depositions on a plurality of substrates are carried out at the same time. Accordingly, a plurality of reflectors can be produced by a single processing.

Effect of the Invention

As described above, according to the present invention, since depositions of the reflective layer, the coloring layer, and the protective layer are carried out consistently within the same vacuum processing room, processes for producing a reflector can be simplified and an operation time can be reduced.

DETAILED DESCRIPTION

Hereinafter, an embodiment of the present invention will be described with reference to the drawings.

Figure 1:
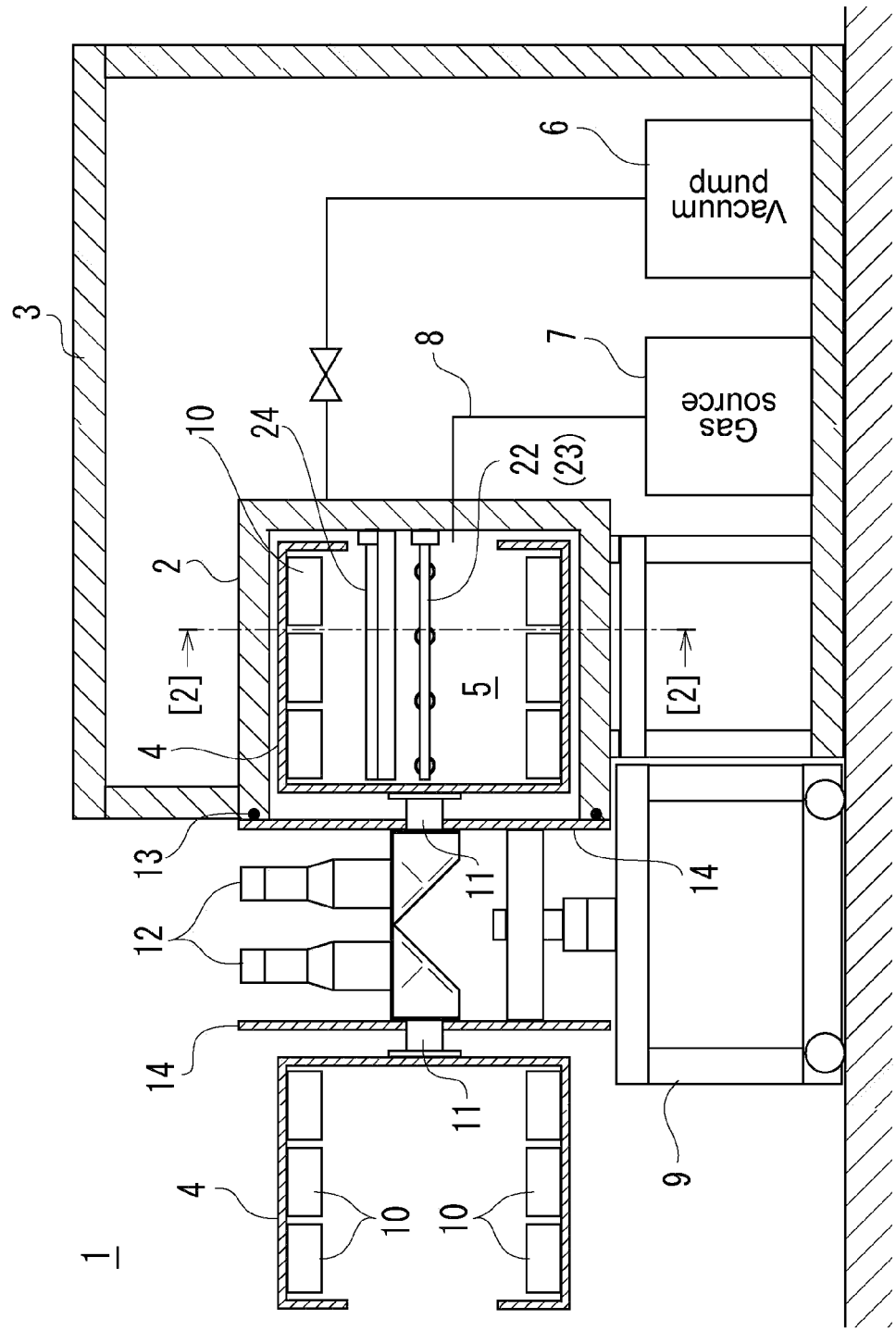
FIG. 1 is a cross-sectional side view showing a schematic structure of a deposition apparatus used for an apparatus for producing a reflector according to an embodiment of the present invention.
Figure 2:
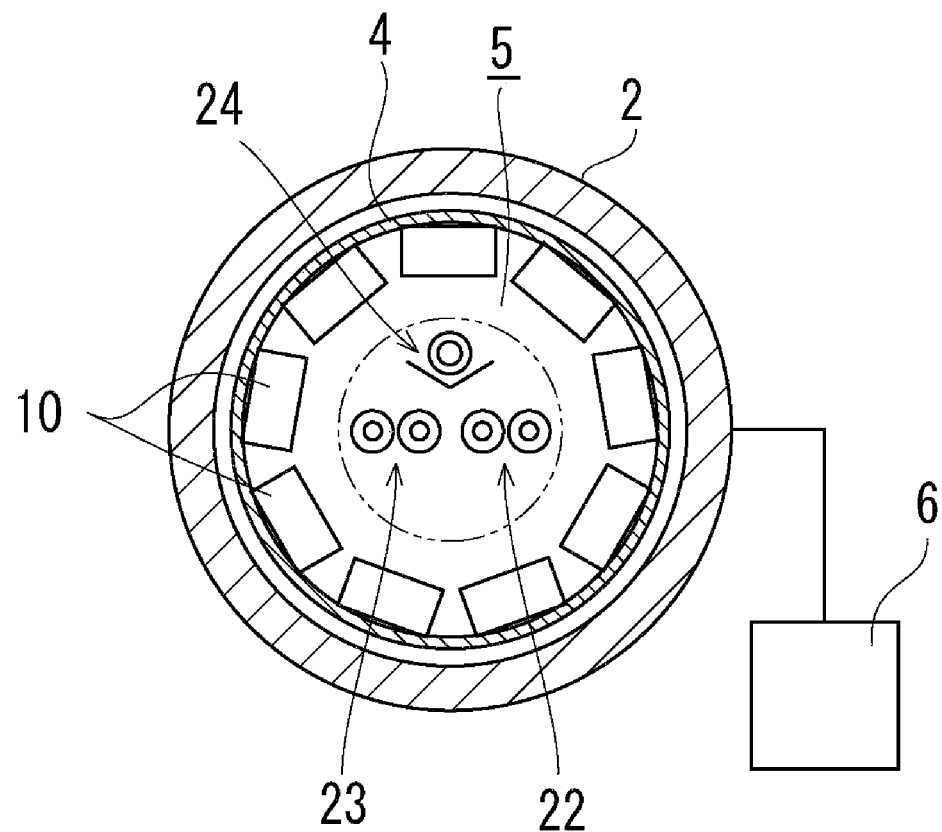
FIG. 2 is a cross-sectional diagram taken along the line [2]-[2] of FIG. 1.

FIG. 1 is a schematic cross-sectional diagram of a deposition apparatus 1 structured as an apparatus for producing a reflector according to the embodiment of the present invention. FIG. 2 is a cross-sectional diagram taken along the line [2]-[2] of FIG. 1. The deposition apparatus 1 includes a rack 3 for supporting a vacuum chamber 2 and a substrate holder 4 structured to be detachable from the vacuum chamber 2.

Inside of the vacuum chamber 2 is a vacuum processing room 5 that is sealed up as the substrate holder 4 is mounted to the vacuum chamber 2, the vacuum processing room 5 capable of being evacuated to a predetermined reduced-pressure atmosphere by a vacuum pump 6. Moreover, the vacuum chamber 2 is connected with, via a gas introduction pipe 8, a gas source 7 for introducing a raw material gas for plasma polymerization into the vacuum processing room 5.

The substrate holder 4 has a substantially-cylindrical drum shape with which a plurality of substrates 10 can be supported on an inner circumferential surface thereof, and is provided plurally (two in this embodiment) in a cluster on a wheeled platform 9. The substrate holder 4 has one end closed and the other end opened and is supported horizontally by a supporting shaft 11 fixed at a center portion of the closed end thereof. The supporting shaft 11 also functions as a driving shaft of a rotational driving source (motor) 12 and is structured such that the substrate holder 4 is rotatable about a shaft center by the drive of the rotational driving source 12.

Further, a lid body 14 that is brought into close contact with an annular sealing member 13 provided at a front surface portion of the vacuum chamber 2 is disposed on the supporting shaft 11 in the vicinity of the closed end of the substrate holder 4. By the lid body 14 being brought into close contact with the vacuum chamber 2, the substrate holder 4 is mounted to the vacuum processing room 5. In the mounted state, the substrate holder 4 is disposed so that the opened end and outer circumferential surface thereof face an inner wall of the vacuum chamber 2 with a certain gap therebetween. An inner portion of the vacuum chamber 2 and an inner portion of the substrate holder 4 are in communication with each other.

Figure 3:
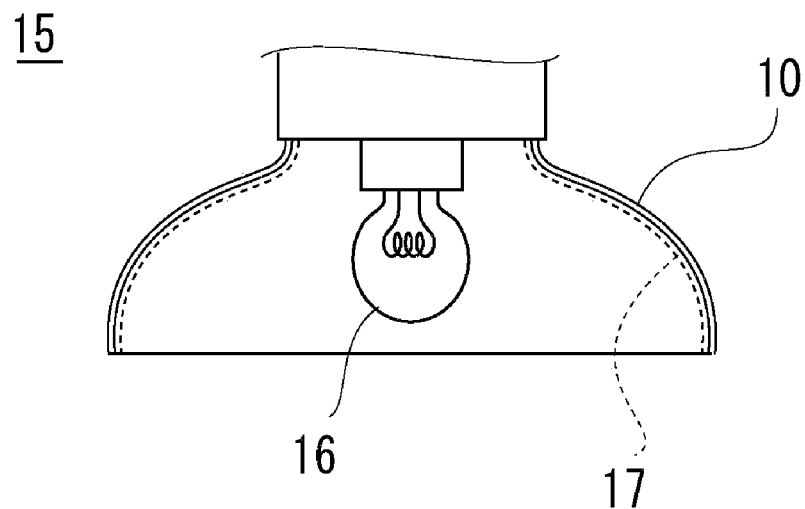
FIG. 3 is a schematic diagram showing a general structure of a lighting fixture.
Figure 4:
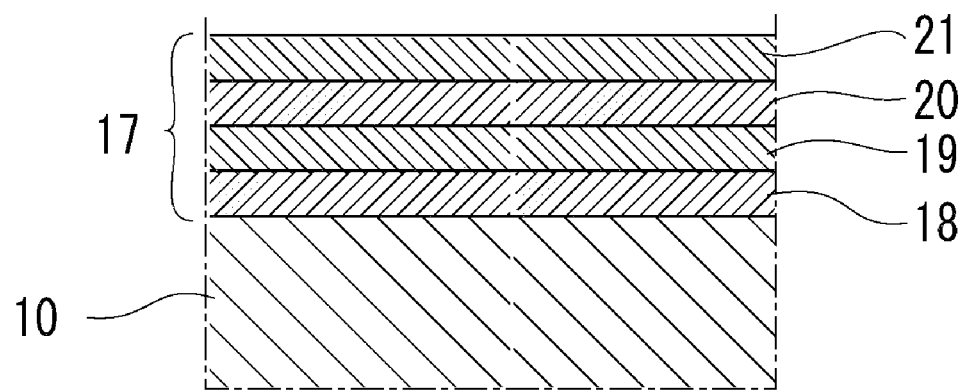
FIG. 4 is a schematic cross-sectional diagram showing a layer structure of a reflector.

The substrate 10 constitutes a main body of a reflector used in a lighting fixture such as a headlight for an automobile. As shown in FIG. 3, a lighting fixture 15 is constituted of a lamp 16 attached to a center portion of the substrate 10 whose surface (inner surface) is formed with a reflecting mirror 17, and has a function of condensing light emitted from the lamp 16 in a front direction (downward in the figure). The reflecting mirror 17 has a structure as shown in FIG. 4 and is constituted of a lamination layer obtained by successively depositing, on a surface of the substrate 10, a base layer 18, a reflective layer 19, a coloring layer 20, and a protective layer 21. It should be noted that the lamination structure of the reflecting mirror 17 and the order in which the various layers are laminated are not limited to the example above. For example, the protective layer 21 may be added between the reflective layer 19 and the coloring layer 20.

The base layer 18, the reflective layer 19, the coloring layer 20, and the protective layer 21 are formed using the deposition apparatus 1 described above. Specifically, the reflective layer 19 is constituted of a metal layer formed by a vacuum vapor-deposition method, the coloring layer 20 is constituted of a pigment layer formed by the vacuum vapor-deposition method, and the base layer 18 and the protective layer 21 are each constituted of a polymerized layer formed by a plasma polymerization method. The base layer 18 is omitted as necessary. The substrate 10 is a plastic injection-molded body.

The deposition apparatus 1 deposits those layers consistently in the common vacuum processing room 5. As shown in FIG. 2, a metal evaporation source 22 as a metal layer forming means for depositing the reflective layer 19, a pigment evaporation source 23 as a pigment layer forming means for depositing the coloring layer 20, and a plasma polymerization electrode 24 as a protective layer forming means or plasma polymerization source for depositing the protective layer 21 (and the base layer 18) are disposed in the vacuum processing room 5. The metal evaporation source 22, the pigment evaporation source 23, and the plasma polymerization electrode 24 are disposed at substantially the center portion of the vacuum processing room 5 and face the substrates 10 inside the substrate holder 4 by being attached along an axial direction from an inner bottom wall of the vacuum chamber 2 as shown in FIG. 1.

Figure 5:
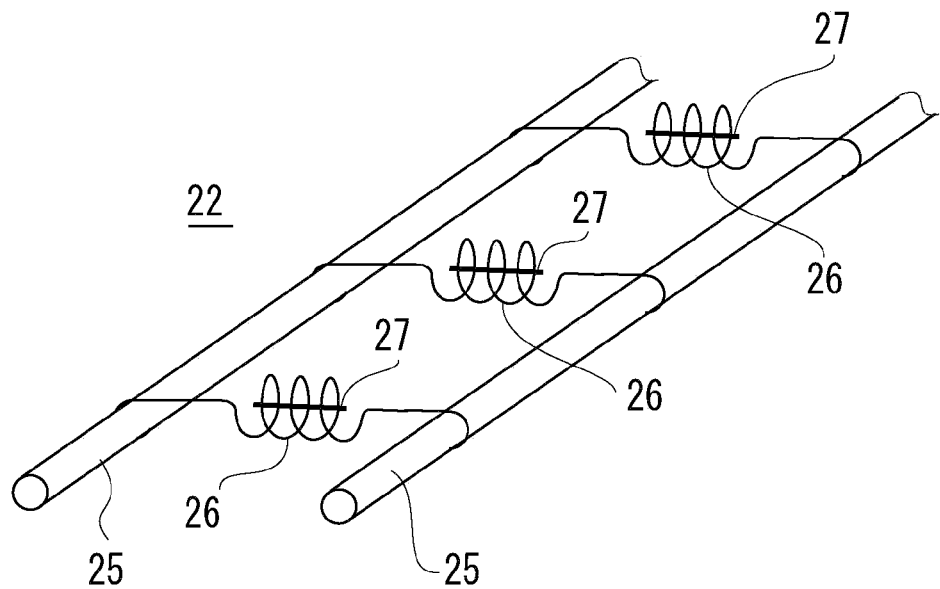
FIG. 5 is a schematic structural diagram of a metal evaporation source incorporated to the deposition apparatus of FIG. 1.

The metal evaporation source 22 is constituted by a resistance heating system as shown in FIG. 5, for example, and a plurality of filaments 26 such as tungsten are attached between a pair of rod-like electrodes 25. The filaments 26 retain an evaporation material (e.g., aluminum) 27. By the evaporation material 27 being heated and evaporated due to energized heating of the filaments 26, the reflective layer 19 constituted of an aluminum layer is deposited on the surface of the substrate 10. It should be noted that the metal evaporation source 22 can also be constituted by a system that uses sputtering.

Figure 6:
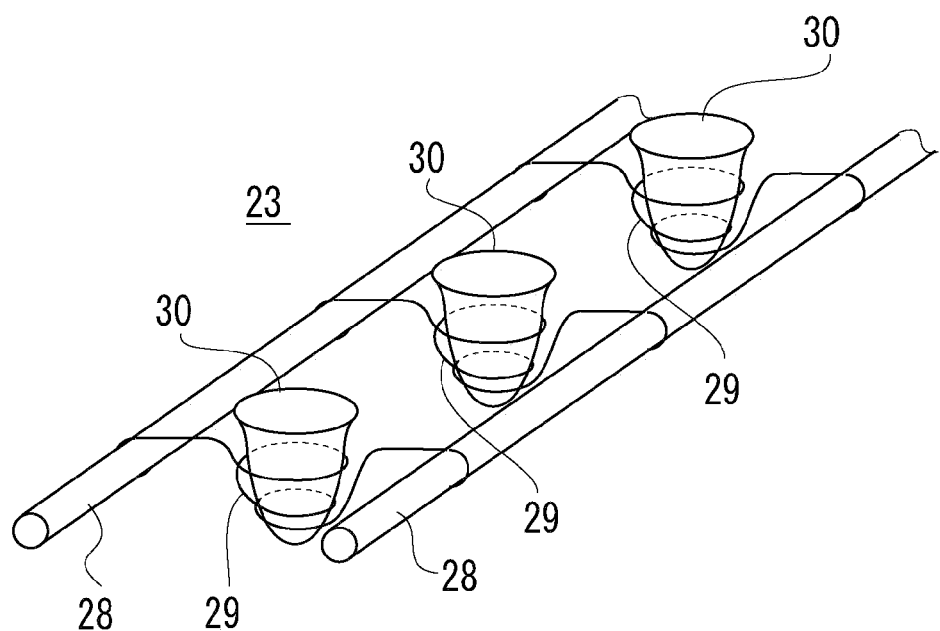
FIG. 6 is a schematic structural diagram of a pigment evaporation source incorporated to the deposition apparatus of FIG. 1.

The pigment evaporation source 23 is also constituted by the resistance heating system as shown in FIG. 6. A plurality of tungsten filaments 29 are attached between a pair of rod-like electrodes 28, and a crucible 30 made of alumina and the like is disposed in each of the filaments 29. The crucible 30 accommodates a pigment material (e.g., phthalocyanine). By the pigment material being heated and evaporated due to energized heating of the filaments 29, the coloring layer 20 for coloring the reflective layer 19 is deposited on the surface of the substrate 10.

The plasma polymerization electrode 24 extends in parallel to respective electrodes 25 and 28 of the metal evaporation source 22 and the pigment evaporation source 23 and is connected to a DC power supply, a high-frequency power supply, or a midfrequency power supply (all of which are not shown). Together with a monomer raw material gas (e.g., hexamethyidisiloxane (HMDSO)) introduced into the vacuum processing room 5 from the gas source 7 via the gas introduction pipe 8, the plasma polymerization electrode 24 constitutes a "plasma polymerization source" of the present invention, and by electric discharge, the protective layer 21 formed of HMDSO, for protecting the base layer 18 and the reflective layer 19 is deposited on the surface of the substrate 10.

Subsequently, a method of producing a reflector using the deposition apparatus 1 structured as described above will be described.

First, the substrate holder 4 that supports the plurality of substrates 10 is mounted to the vacuum chamber 2, and the lid body 14 is brought into close contact with the sealing member 13 to thus shut out air from the vacuum processing room 5. After that, the vacuum pump 6 is driven to evacuate and pressure-reduce the vacuum processing room 5 to a predetermined vacuum degree. When the vacuum processing room 5 reaches the predetermined vacuum degree, the substrate holder 4 is rotated inside the vacuum processing room 5 by the driving of the rotational driving source 12. Accordingly, the substrates 10 revolve inside the vacuum processing room 5. It should be noted that a rotation mechanism for the substrates 10 may be added to the substrate holder 4.

In this state, the monomer raw material gas is introduced into the vacuum processing room 5 from the gas source 7 via the gas introduction pipe 8 to thus deposit the base layer 18 formed of HMDSO on the surface of the substrate 10 by the electric discharge operation of the plasma polymerization electrode 24. It should be noted that instead of forming the base layer 18, the surface of the substrate 10 may be plasma-cleaned by introducing an argon gas or air.

Next, by stopping the electric discharge of the plasma polymerization electrode 24 and the introduction of the monomer raw material gas and evaporating the evaporation material 27 by energize-heating the filaments 26 of the metal evaporation source 22 at, for example, 800° C. to 1000° C., the reflective layer 19 formed of aluminum is deposited on the base layer 18 on the surface of the substrate 10.

After that, the filaments 26 of the metal evaporation source 22 are stopped being energized, and this time, by energize-heating the filaments 29 of the pigment evaporation source 23 at, for example, 500° C. to thus heat the crucibles 30 to about 350° C. and evaporate the pigment material, the coloring layer 20 is deposited on the reflective layer 19 on the surface of the substrate 10.

Then, after the filaments 29 of the pigment evaporation source 23 are stopped being energized, the plasma polymerization electrode 24 is again caused of electric discharge to additionally introduce the monomer raw material gas, whereby the protective layer 21 is deposited on the coloring layer 20 on the surface of the substrate 10. It should be noted that after that, as necessary, impartment of hydrophilicity may be carried out on the surface of the substrate 10 by plasma processing in which air, oxygen, or argon gas is introduced.

As described above, according to this embodiment, the reflective layer 19 and the coloring layer 20 are deposited by the vacuum vapor-deposition method, and the base layer 18 and the protective layer 21 are deposited by the plasma polymerization method. Thus, those layers can be deposited in the same vacuum processing room 5. Accordingly, processes for forming the reflecting mirror 17 can be simplified and an operation time can be reduced.

Further, according to the deposition apparatus 1 of this embodiment, by disposing the metal evaporation source 22, the pigment evaporation source 23, and the plasma polymerization source (electrode) 24 in a single vacuum processing room 5, consistent depositions of the base layer 18, the reflective layer 19, the coloring layer 20, and the protective layer 21 with respect to the surface of the substrates 10 become possible. Accordingly, it becomes possible to simplify equipment for producing the reflecting mirror 17, reduce costs, and reduce sizes.

Furthermore, according to this embodiment, because it is possible to structure the substrate holder 4 so as to be rotatable inside the vacuum processing room and subject the plurality of substrates 10 supported by the substrate holder 4 to the deposition processing at the same time, a plurality of reflectors can be produced by a single processing, thus enhancing productivity.

It should be noted that in the deposition apparatus 1 of this embodiment, while one of the substrate holders 4 is mounted to the vacuum chamber 2, unprocessed substrates 10 are being prepared in the other substrate holder 4. After deposition on the substrates 10 supported by the mounted one of the substrate holders 4 is completed, the substrate holder 4 concerned is detached from the vacuum chamber 2. Then, the wheeled platform 9 is moved so that the other one of the substrate holders 4 is mounted to the vacuum chamber 2. Subsequently, depositions of the various layers are carried out as described above. Meanwhile, the processed substrates 10 are removed from the detached one of the substrate holders 4.

EXAMPLE

Hereinafter, an example of the present invention will be described, but the present invention is not limited to the example below.

Referring to FIG. 1, evaporation materials were set to the respective evaporation sources 22 and 23 inside the vacuum chamber 2, the substrate holder 4 supporting the plurality of substrates 10 was mounted to the vacuum chamber 2 (vacuum processing room 5), and the vacuum processing room 5 was evacuated to a predetermined vacuum degree. The monomer raw material gas of up to 10 Pa was introduced from the gas source 7, a DC current of 2 kV was applied to the plasma polymerization electrode 24 for electric discharge, and deposition was carried out for about 30 seconds, to thus deposit the base layer 18.

Next, the filaments 26 of the metal evaporation source 22 were energize-heated to deposit a metal material (aluminum) for about 60 seconds, thus depositing the reflective layer 19 on the base layer 18. Subsequently, the filaments 29 of the pigment evaporation source 23 were energize-heated to deposit a pigment material (phthalocyanine) for about 30 seconds, thus depositing the coloring layer 20 on the reflective layer 19. Accordingly, the reflective layer 19 was colored light blue.

Next, the monomer raw material of up to 10 Pa was introduced, a DC current of 2 kV was applied to the plasma polymerization electrode 24 for electric discharge, and deposition was carried out for about 180 seconds, to thus deposit the protective layer 21 on the coloring layer 20. Furthermore, an argon gas of $10^{-1}$ Pa was introduced, and impartment of hydrophilicity to the surface was carried out by DC plasma using the plasma polymerization electrode 24 for about 10 seconds.

As a result of carrying out an acid resistance test and alkali resistance test on the reflecting mirror 17 produced as described above, it was confirmed in either of the tests that sufficient layer characteristics were obtained.

Heretofore, the embodiment of the present invention has been described. However, the present invention is of course not limited thereto, and various modifications can be made based on a technical idea of the present invention.

For example, in the above embodiment, the reflective layer 19, the coloring layer 20, and the protective layer 21 (base layer 18) are respectively formed of aluminum, phthalocyanine, and HMDSO. However, the materials of those layers are not limited thereto and can be changed appropriately.

Further, in the above embodiment, two substrate holders 4 are disposed on the wheeled platform 9. However, the number may be increased.

The invention claimed is:
1. An apparatus for producing a reflector formed by depositing on a surface of a substrate a reflective layer, a coloring layer, and a protective layer in a predetermined order, comprising:
   a metal layer forming means for depositing the reflective layer;
   a pigment layer forming means for depositing the coloring layer;
   a protective layer forming means for depositing the protective layer;
   a vacuum chamber that has inside a single vacuum processing room including the metal layer forming means, the pigment layer forming means, and the protective layer forming means; and
   a drum-shaped substrate holder that simultaneously accommodates the metal layer forming means, the pigment layer forming means, and the protective layer forming means, the substrate holder being disposed rotatably inside the vacuum processing room and having an inner circumferential surface configured to be capable of supporting a plurality of substrates;
   wherein the substrate holder is structured to be detachable from the vacuum processing room; and
   wherein the vacuum chamber includes an open-end portion and an annular sealing member provided at the open-end portion, and
   the substrate holder includes a lid body that seals up, when the substrate holder is mounted to the vacuum chamber, the inside of the vacuum chamber by being brought into close contact with the open-end portion via the sealing member.

2. The apparatus for producing a reflector according to claim 1, wherein:

the metal layer forming means is a metal evaporation source;

the pigment layer forming means is a pigment evaporation source; and the protective layer forming means is a plasma polymerization source.

3. The apparatus for producing a reflector according to claim 1, further comprising a wheeled platform that moves the substrate holder with respect to the vacuum chamber wherein:

the substrate holder is provided plurally on the wheeled platform; and wherein, when one of the plurality of substrate holders is mounted to the vacuum chamber, the other one of the plurality of substrate holders is located outside the vacuum chamber.

* * * * *